(12) United States Patent
Li et al.

(10) Patent No.: US 7,468,224 B2
(45) Date of Patent: Dec. 23, 2008

(54) BATTERY HAVING IMPROVED POSITIVE ELECTRODE AND METHOD OF MANUFACTURING THE SAME

(75) Inventors: Wen Li, Ann Arbor, MI (US); Yutaka Oyama, Aichi (JP); Masaki Matsui, Shizuoka (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/080,617

(22) Filed: Mar. 15, 2005

(65) Prior Publication Data

US 2006/0024582 A1    Feb. 2, 2006

Related U.S. Application Data

(60) Provisional application No. 60/614,517, filed on Sep. 30, 2004, provisional application No. 60/553,636, filed on Mar. 16, 2004.

(51) Int. Cl.
H01M 4/62    (2006.01)

(52) U.S. Cl. ............... 429/232; 429/188; 29/623.1; 252/182.1

(58) Field of Classification Search ............ 429/245
See application file for complete search history.

(56) References Cited

U.S. PATENT DOCUMENTS

| | | | |
|---|---|---|---|
| 3,639,100 A | 2/1972 | Rick | 23/202 |
| 4,448,611 A | 5/1984 | Grellet et al. | 148/6.11 |
| 4,463,071 A | 7/1984 | Gifford et al. | 429/194 |
| 5,314,765 A | 5/1994 | Bates | 429/194 |
| 5,518,839 A | 5/1996 | Olsen | 429/192 |
| 5,521,029 A * | 5/1996 | Fiorino et al. | 205/150 |
| 5,552,241 A | 9/1996 | Mamantov et al. | 429/103 |
| 5,582,935 A * | 12/1996 | Dasgupta et al. | 429/218.1 |
| 5,589,291 A | 12/1996 | Carlin et al. | 429/103 |
| 5,591,544 A | 1/1997 | Fauteux et al. | 429/209 |
| 5,665,491 A * | 9/1997 | Tomiyama et al. | 429/218.1 |
| 5,938,914 A | 8/1999 | Dawless et al. | 205/391 |
| 6,224,824 B1 | 5/2001 | Zhang et al. | 420/94 |
| 6,326,104 B1 | 12/2001 | Caja et al. | 429/188 |
| 6,365,301 B1 | 4/2002 | Michot et al. | 429/307 |

(Continued)

FOREIGN PATENT DOCUMENTS

JP    11-260400    *    9/1999

(Continued)

*Primary Examiner*—Jonathan Crepeau
*Assistant Examiner*—Tony Chuo
(74) *Attorney, Agent, or Firm*—Gifford, Krass, Sprinkle, Anderson & Citkowski, P.C.

(57) ABSTRACT

There is provided a battery containing an electrolyte, according to which oxidative decomposition of the electrolyte is suppressed. The battery contains a positive electrode having an active material and an electron conducting material. The electron conducting material has a barrier layer at least on the surface thereof. This barrier layer is substantially constituted from at least one material selected from (a) oxides of elements in group 2 to 14 and the third or subsequent period of the periodic table, (b) carbides of elements in group 2 to 14 and the third or subsequent period of the periodic table, (c) nitrides of elements in group 2 to 14 and the third or subsequent period of the periodic table, and (d) tungsten.

25 Claims, 3 Drawing Sheets

U.S. PATENT DOCUMENTS

| | | | |
|---|---|---|---|
| 6,402,795 B1 | 6/2002 | Chu et al. | 29/623.5 |
| 6,403,263 B1 * | 6/2002 | Roach | 429/233 |
| 6,413,284 B1 | 7/2002 | Chu et al. | 29/623.1 |
| 6,495,287 B1 | 12/2002 | Kolb et al. | 429/215 |
| 6,544,691 B1 | 4/2003 | Guidotti | 429/344 |
| 6,797,428 B1 | 9/2004 | Skotheim et al. | 429/126 |
| 2002/0028389 A1 * | 3/2002 | Sonoda et al. | 429/324 |
| 2002/0177044 A1 * | 11/2002 | Yagi et al. | 429/231.95 |
| 2003/0232248 A1 * | 12/2003 | Iwamoto et al. | 429/233 |
| 2004/0043292 A1 * | 3/2004 | Christian et al. | 429/223 |
| 2004/0048157 A1 * | 3/2004 | Neudecker et al. | 429/231.2 |
| 2004/0185346 A1 * | 9/2004 | Takeuchi et al. | 429/231.9 |
| 2005/0208380 A1 * | 9/2005 | Park et al. | 429/232 |
| 2006/0147790 A1 * | 7/2006 | Zaghib et al. | 429/44 |

FOREIGN PATENT DOCUMENTS

| | | | |
|---|---|---|---|
| JP | 11-339800 | * | 12/1999 |
| JP | 2000-188134 | * | 7/2000 |
| WO | WO 2004/038834 A2 | * | 5/2004 |

* cited by examiner

BATTERY HAVING IMPROVED POSITIVE ELECTRODE AND METHOD OF MANUFACTURING THE SAME

REFERENCE TO RELATED APPLICATION

This application claims priority from U.S. Provisional Patent Application Ser. Nos. 60/553,636, filed Mar. 16, 2004 and 60/614,517, filed Sep. 30, 2004, the entire content of both of which are incorporated herein by reference.

FIELD OF THE INVENTION

The present invention relates to a battery containing an electrolyte, and a method of manufacturing the battery.

BACKGROUND OF THE INVENTION

Secondary batteries in which charging and discharging are carried out through cations such as lithium ions passing between a positive electrode and a negative electrode are known. A typical example of such a battery is a lithium ion secondary battery. In such a secondary battery, an electrolyte in which a supporting electrolyte such as $LiPF_6$ is dissolved in a nonaqueous solvent such as ethylene carbonate is often used.

On the other hand, molten salts that are able to be liquid in a temperature range in which a battery is used are known. Studies are being carried out into using an electrolyte having a composition containing such a molten salt as an electrolyte for a secondary battery as described above. However, with a battery in which such a molten salt-containing electrolyte is used, if the electric potential of the positive electrode becomes high, then the molten salt contained in the electrolyte becomes prone to undergoing oxidative decomposition. It has thus been difficult to raise the battery voltage of batteries containing such a molten salt-containing electrolyte.

SUMMARY OF THE INVENTION

It is an object of the present invention to provide a battery containing an electrolyte, according to which oxidative decomposition of the electrolyte is suppressed. It is another object of the present invention to provide a method of manufacturing such a battery. The electrolyte may be, for example, a molten salt electrolyte or organic electrolyte.

One invention disclosed here relates to a battery. This battery comprises an electrolyte, for example, an electolyte containing a molten salt, and a positive electrode having an active material and an electron conducting material. This electron conducting material is used as an additive to give electrical conductivity to the active material. The electron conducting material has a barrier layer at least on the surface thereof. This barrier layer is substantially constituted from at least one material (barrier material) selected from (a) oxides having at least one element in group 2 to 14 and the third or subsequent period of the periodic table as a constituent element thereof, (b) carbides having at least one element in group 2 to 14 and the third or subsequent period of the periodic table as a constituent element thereof, (c) nitrides having at least one element in group 2 to 14 and the third or subsequent period of the periodic table as a constituent element thereof, and (d) tungsten.

Note that the group numbers in the periodic table indicated in this specification follow the indication of group numbers 1 to 18 according to the 1989 IUPAC revised edition of inorganic chemical nomenclature.

Moreover, 'molten salt' in the invention disclosed here refers to a salt at least part of which is able to be liquid in the ordinary state of use of a battery. In general, in the ordinary state of use of a battery, the temperature of the battery (temperature of use) is in a range from approximately −50° C. (more commonly −30° C.) to approximately 100° C. (more commonly 80° C.). A salt at least part of which exhibits a liquid form in at least part of such a temperature range is included in the concept of 'molten salt' here.

In one preferable embodiment of the battery disclosed here, the barrier layer contains an oxide of at least one metal in group 4 to 14 of the periodic table. For example, the barrier layer may contain an oxide of at least one metal in group 4 to 6 of the periodic table. A preferable example of such a metal oxide is a titanium oxide (e.g. $TiO_2$ or $Ti_4O_7$). Alternatively, the barrier layer may contain an oxide of at least one metal in group 13 or 14. A preferable example of such a metal oxide is an indium-tin oxide (ITO). An electron conducting material having a barrier layer substantially constituted from at least one such oxide is preferable.

In another preferable embodiment of the battery disclosed here, the barrier layer contains a carbide of at least one metal in group 4 to 14 of the periodic table. For example, the barrier layer may contain a carbide of at least one metal in group 4 to 6 of the periodic table. Preferable examples of such a metal carbide are a titanium carbide (e.g. TiC) and a tantalum carbide (e.g. TaC). An electron conducting material having a barrier layer substantially constituted from at least one such carbide is preferable.

In a typical embodiment of the battery disclosed here, the material constituting the barrier layer has a lower activity than at least carbon to oxidative decomposition of the molten salt. That is, at least the surface of the electron conducting material used in the positive electrode is constituted from a material having a lower activity than carbon to oxidative decomposition of the molten salt. Such a material constituting the barrier layer is preferably an electrically conductive material. Here 'electrically conductive' typically refers to the electrical conductivity (electron conductivity) of the material being at least $1 \times 10^{-2}$ S/cm (more preferably at least $1 \times 10^3$ S/cm) in the ordinary state of use (at the temperature of use) of the battery. For example, a material having an electrical conductivity at 25° C. in the above range is preferable.

The surface and the interior of the electron conducting material may be substantially constituted from the same material (barrier material). A preferable example of such an electron conducting material is particles consisting of any of the barrier materials described above.

Moreover, the surface and the interior of the electron conducting material may be constituted from different materials. For example, the electron conducting material may be one having a barrier layer substantially constituted from any of the barrier materials described above on the surface thereof, with the interior of the electron conducting material being constituted from a material other than a barrier material. Alternatively, the electron conducting material may have a barrier layer substantially constituted from any of the barrier materials described above on the surface thereof, with the interior of the electron conducting material being constituted from a barrier material different to that on the surface. A material having good electrical conductivity is preferably selected as the material constituting the interior of the electron conducting material. Examples of such an interior-constituting material include electrically conductive carbon such as carbon black, metals having a high electrical conductivity such as platinum (Pt), tungsten (W), aluminum (Al), copper (Cu) and silver (Ag), metal oxides such as $Tl_2O_3$, $WO_2$ and $Ti_4O_7$, and metal carbides such as WC, TiC and TaC. Preferable examples of an electron conducting material in which the surface and the interior are constituted from different materials include an electron conducting material having a barrier layer as described above on the surface of carbon particles, an electron conducting material having a barrier layer as described above on the surface of metal particles, and an electron conducting material having a barrier layer as described above on the surface of particles consisting of an electrically conductive metal oxide or metal carbide.

In one preferable embodiment of the battery disclosed here, the active material of the positive electrode is substantially constituted from a composite oxide having lithium and a transition metal as constituent elements thereof. A preferable example of such a composite oxide is a composite oxide having lithium, nickel and manganese as constituent elements thereof.

In another preferable embodiment, the positive electrode has an active material able to make the electric potential of the positive electrode at least 4.5 V higher than the potential of metallic lithium. A preferable example of such an active material is an active material substantially constituted from a composite oxide having lithium, nickel and manganese as constituent elements thereof.

The molten salt contained in the electrolyte may be one that exhibits a liquid state in at least part of a temperature range between 10 and 40° C. A molten salt able to maintain a liquid state in a temperature range at least from 10 to 40° C. is preferable.

The cation in the molten salt may be, for example, at least one cation selected from an imidazolium ion, an ammonium ion and a sulfonium ion. A molten salt that is constituted from such a cation and a counter ion and exhibits a liquid state in a temperature range as above is preferable.

In one preferable embodiment of the battery disclosed here, the principal component of the electrolyte is a molten salt as described above. Such an electrolyte may contain a supporting electrolyte. As the supporting electrolyte, one able to appropriately supply the cation that migrates to charge and discharge the battery may be selected, this being in accordance with the type of this cation. For example, in the case of a battery in which charging and discharging are carried out through migration of lithium ions, any of various lithium salts can be preferably selected as the supporting electrolyte.

The battery disclosed here may have a negative electrode having an active material able to absorb and release lithium ions. In a preferable embodiment, this negative electrode has an active material able to maintain the potential of the negative electrode at 1 V or more higher than the potential of metallic lithium. A preferable example of such an active material is an active material substantially constituted from a lithium titanate represented by $Li_4Ti_5O_{12}$.

Another invention disclosed here relates to a method of manufacturing a battery. In this method, an electron conducting material having a barrier layer at least on a surface thereof is prepared. This barrier layer is substantially constituted from at least one material (barrier material) selected from (a) oxides of at least one element in group 2 to 14 of the periodic table (excluding boron and carbon), (b) carbides of at least one element in group 2 to 14 of the periodic table (excluding boron and carbon), and (c) nitrides having at least one element in group 2 to 14 and the third or subsequent period of the periodic table as a constituent element thereof, and (d) tungsten. A positive electrode is manufactured using this electron conducting material and a positive electrode active material. The battery can be constructed using this positive electrode, an electrolyte containing a molten salt, and a negative electrode.

As the electron conducting material used in this method, one in which the surface and the interior thereof are substantially constituted from the same material may be selected. Alternatively, an electron conducting material in which the surface and the interior thereof are constituted from different materials may be used. Such an electron conducting material can, for example, be obtained by attaching fine particles (e.g. nanoparticles) consisting of said barrier material onto the surface of particles consisting of another material (e.g. carbon particles and/or metal particles). That is, the barrier layer can be formed on the surface of these particles through the fine particles of the barrier material.

DETAILED DESCRIPTION OF THE INVENTION

Figure 1:
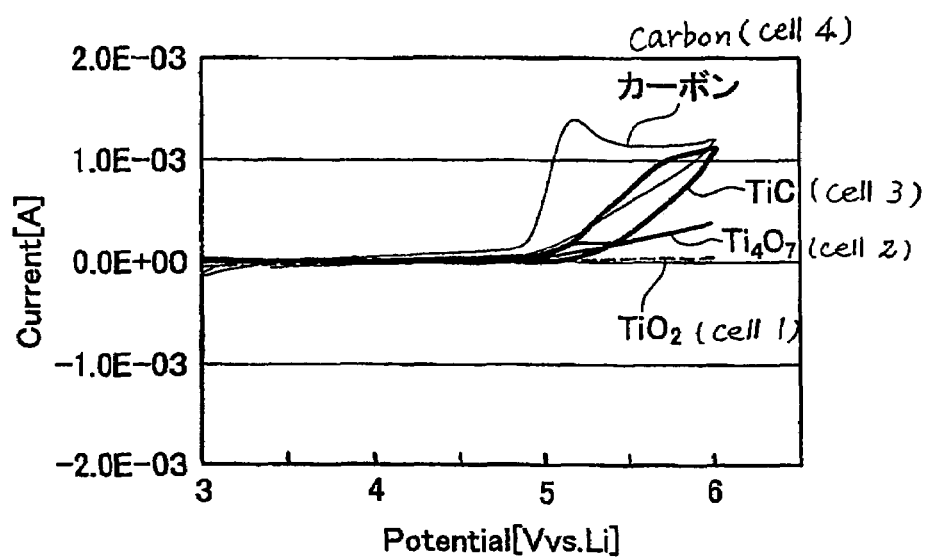
FIG. 1 is a graph showing results of cyclic voltammetry measurements for cells manufactured using an appropriate electrolyte and several electrodes on which different materials are held.

Following is a detailed description of preferable embodiments of the present invention. Note that technical matters that are required for carrying out the present invention but are not particularly mentioned in the present specification (e.g. the methods of manufacturing the active materials of the positive electrode and the negative electrode, the method of manufacturing the molten salt, etc.) are matters of design variation that could be apprehended by a person skilled in the art based on prior art. The present invention can be carried out based on the technical details disclosed in the present specification and common general technical knowledge in the field in question.

The electron conducting material of the positive electrode has a barrier layer substantially constituted from a prescribed material (barrier material) at least on the surface of the electron conducting material. That is, at least the surface part of the electron conducting material is substantially constituted from a prescribed barrier material.

The barrier layer may contain (a) an oxide having at least one element selected from group 2 to 14 in the third or subsequent period of the periodic table as a constituent element thereof. Preferable examples of an element in the oxide are elements in groups 4 to 6 of the periodic table (Ti, Zr, Hf, V, Nb, Ta, Cr, Mo, W). Moreover, other preferable examples are elements in groups 12 to 14 of the periodic table (Zn, Al, In, Tl, Si, Sn, etc.).

Specific preferable examples of an oxide constituting the barrier layer include $SnO_2$, $Ti_4O_7$, $In_2O_3/SnO_2$ (ITO), $Ta_2O_5$, $WO_2$, $W_{18}O_{49}$, $CrO_2$ and $Tl_2O_3$. With these oxides, the oxidation number of the metal in the oxide is relatively high, and hence the resistance to oxidation is good. Such an oxide is thus suitable as a material (electron conducting material) in the positive electrode.

Moreover, other preferable examples of an oxide constituting the barrier layer include MgO, $BaTiO_3$, $TiO_2$, $ZrO_2$, $Al_2O_3$, and $SiO_2$. These oxides have excellent electrochemical stability. Such an oxide is thus suitable as a material (electron conducting material) in the positive electrode.

Moreover, the barrier layer may contain (b) a carbide having at least one element selected from group 2 to 14 in the third or subsequent period of the periodic table as a constituent element thereof. Preferable examples of an element in such a carbide are elements in groups 4 to 6 of the periodic table (Ti, Zr, Hf, V, Nb, Ta, Cr, Mo and W).

Preferable examples of a carbide constituting the barrier layer are transition metal carbides that can adopt an interstitial-type structure in which the carbon atoms are in the gaps in the close-packed structure of the metal atoms. Metals able to form a carbide having such a structure are metals having an atomic radius of at least approximately 1.4 Å and vanadium. Specific examples of such a carbide are carbides represented by the formula MC (M is selected from Ti, Zr, Hf, V, Nb, Ta, Mo and W) and carbides represented by the formula $M_2C$ (M is selected from V, Ta, Mo and W).

Moreover, the barrier layer may contain (c) a nitride having at least one element selected from group 2 to 14 in the third or subsequent period of the periodic table as a constituent element thereof, preferable examples of an element in such a nitride being elements in groups 4 to 6 of the periodic table (Ti, Zr, Hf, V, Nb, Ta, Cr, Mo and W), or (d) metallic tungsten.

Most common conventional positive electrodes have carbonaceous material (typically so-called electrically conductive carbon) as the electron conducting material that gives electrical conductivity to the active material. The present inventors have discovered that oxidative decomposition of a molten salt is promoted by the presence of such an electron conducting material made of carbon.

With a barrier layer consisting of at least one selected from (a) oxides, (b) carbides, (c) nitrides, and (d) metallic tungsten as described above, the activity of the electron conducting material disclosed herein to oxidative decomposition of the electrolyte may be lower than that of at least carbon. Here, the degree of activity to oxidative decomposition of the electrolyte can be ascertained by, for example, constructing an electrochemical cell using an electrode having the material (barrier material) constituting the barrier layer and an electrolyte, and applying a voltage between the electrode as a positive electrode and a counter electrode (typically cyclic voltammetry (CV) measurements are carried out). If the electrolyte undergoes oxidative decomposition, then an irreversible current (oxidative decomposition current) will be detected in the cell. It can thus be said that a material has a lower activity to oxidative decomposition of the electrolyte than carbon if the material satisfies at least one of the following: compared with the case of using an electrode having carbon as the positive electrode, an oxidative decomposition current is not detected until a higher voltage, or the voltage at which an oxidative decomposition current of at least a certain value starts to flow is higher, or the oxidative decomposition current detected at a given voltage is lower. In the case that an electron conducting material having such a barrier material at least on the surface thereof is used as a constituent material of the positive electrode in a battery containing an electrolyte, oxidative decomposition of the electrolyte will be less prone to being brought about than with carbon.

A preferable example of the barrier material is one exhibiting the following property. That is, a barrier material exhibiting the property that in the case of constructing an electrochemical cell as described above using an electrode having the barrier material, and carrying out cyclic voltammetry measurements with a sweep rate of 100 mV/sec at room temperature, the current that flows through the cell when the applied voltage reaches 5 V (versus Li) is lower than the current that flows under the same conditions through an electrochemical cell in which an electrode having carbon is used. More preferable is a barrier material for which the current at an applied voltage of 5 V (versus Li) is approximately ½ or less, yet more preferably approximately 1/10 or less, particularly preferably approximately 1/100 or less, of that for a cell in which an electrode having carbon is used.

The electron conducting material disclosed here may be such that at least the surface thereof is substantially constituted from a barrier material as described above. In one preferable embodiment, the surface and the interior of the electron conducting material are (i.e. the whole of the electron conducting material is) substantially constituted from a substantially homogeneous barrier material. In other words, the barrier layer constitutes the surface and the interior of the electron conducting material in continuous fashion.

Moreover, the electron conducting material disclosed here may be such that the constituent materials of the surface and the interior are different. For example, the electron conducting material may have a structure in which a barrier layer substantially constituted from a barrier material of a certain composition is provided on the surface of particles consisting of a barrier material of a different composition. Alternatively, the electron conducting material may have a structure in which a barrier layer substantially constituted from a barrier material of a certain composition is provided on the surface of particles consisting of a material other than a barrier material.

Out of the previously mentioned barrier layer-constituting materials (barrier materials), for example, oxides such as $SnO_2$, $Ti_4O_7$, $In_2O_3/SnO_2$ (ITO), $Ta_2O_5$, $WO_2$, $W_{18}O_{49}$, $CrO_2$ and $Tl_2O_3$, carbides represented by the formula MC, carbides represented by the formula $M_2C$, metal nitrides, and metallic tungsten are electrically conductive. These are thus suitable as the material constituting part (the surface, the interior, etc.) or the whole of the electron conducting material. Particles substantially constituted from at least one of these materials are a preferable example of the electron conducting material disclosed here. Moreover, particles having a surface substantially constituted from at least one of these materials and an interior constituted from a material having a higher electrical conductivity are another preferable example of the electron conducting material disclosed here. There are no particular limitations, but an example of the material constituting the interior of this type of electron conducting material is carbon known as an electron conducting material in common conventional positive electrodes (so-called electrically conductive carbon, e.g. carbon black). Other examples of the material constituting the interior of the electron conducting material are metals having a high electrical conductivity such as platinum (Pt), tungsten (W), aluminum (Al) copper (Cu) and silver (Ag), metal oxides such as $Tl_2O_3$, $WO_2$ and $Ti_4O_7$, and metal carbides such as WC, TiC and TaC.

Moreover, out of the previously mentioned barrier layer-constituting materials, for example oxides such as MgO, $BaTiO_3$, $TiO_2$, $ZrO_2$, $Al_2O_3$, and $SiO_2$ are substantially insulating. With an electron conducting material having a barrier layer substantially constituted from such an oxide, the interior of the electron conducting material is thus preferably constituted from an electrically conductive material. As the material constituting the interior of this type of electron conducting material, for example at least one out of electrically conductive barrier materials (e.g. $Ti_4O_7$), electrically conductive carbon, and metals may be selected.

The form of the electron conducting material disclosed here is typically particulate. The shape of the particles is, broadly speaking, preferably spherical, fiber-like or flake-like. The average particle diameter of the particles may be, for example, approximately 10 nm to 10 µm. The average particle diameter of the particles is preferably approximately 10 nm to 5 µm, more preferably approximately 10 nm to 1 µm.

With an electron conducting material having a structure with a barrier layer on the surface of particles consisting of a material other than a barrier material, the average thickness of the barrier layer is preferably at least approximately 1 nm, more preferably at least approximately 5 nm. There are no particular limitations on the upper limit of the thickness of the barrier layer, but this can be made to be, for example, approximately 100 nm or less. In the case that the material constituting the barrier layer (barrier material) is substantially insulating, the thickness of the barrier layer is preferably made to be not more than approximately 100 nm, more preferably not more than approximately 30 nm.

Such an electron conducting material may, for example, be one in which nanoparticles of an insulating barrier material are held on the surface of particles consisting of an electrically conductive material (which may be an electrically conductive barrier material). Nanoparticles are particles having a particle diameter of nanometer order, typically particles with an average particle diameter in a range of approximately 5 to 100 nm.

An electron conducting material in which the constituent materials of the surface and the interior are different can be manufactured, for example, applying, on the surface of particles consisting of a material for constituting the interior (core particles), particles having a smaller diameter than the core particles and consisting of a material for constituting the surface (surface-forming particles). An example of a preferable manufacturing method is a method in which a mixture of these particles is mixed (kneaded) while applying pressure. For example, a so-called mechanochemical method can be adopted. The mechanochemical method may be either a dry or wet method.

The average particle diameter of the core particles used is, for example, preferably in a range of approximately 50 nm to 5 µm, more preferably in a range of approximately 50 nm to 3 µm. The average particle diameter of the surface-forming particles used is preferably not more than $1/5$ (typically approximately $1/5$ to $1/300$), more preferably not more than $1/10$ (typically approximately $1/10$ to $1/100$), of the average particle diameter of the core particles. It is preferable to use nanoparticles having an average particle diameter in a range of approximately 5 to 100 nm (more preferably approximately 5 to 50 nm, yet more preferably approximately 10 to 30 nm) as the surface-forming particles. An electron conducting material obtained using such nanoparticles will have a dense, uniform barrier layer on the surface of the core particles.

Another method of manufacturing an electron conducting material in which the constituent materials of the surface and the interior are different is a method in which a slurry in which the core particles and the surface-forming particles are dispersed in an appropriate solvent is dried. As the method of drying the slurry, a spray drying method can be preferably used. As a result, particles in which the surface-forming particles are coated on the surface of the core particles can be obtained. If necessary, the particles may be further heated or baked.

With a battery comprising a positive electrode having an electron conducting material as described above and an electrolyte containing a molten salt, an effect of suppressing oxidative decomposition of the molten salt can be produced regardless of the type of the cation that passes between the positive electrode and the negative electrode (i.e. the cation involved in charging and discharging). The art disclosed here can thus be applied to batteries that are charged and discharged through the passage of any of various cations. Examples of such cations include alkali metal ions such as lithium ions, sodium ions, potassium ions and cesium ions; alkaline earth metal ions such as calcium ions and barium ions; other metal ions such as magnesium ions, aluminum ions, silver ions and zinc ions; ammonium ions such as tetrabutylammonium ions, tetraethylammonium ions, tetramethylammonium ions, triethylmethylammonium ions and triethylammonium ions; imidazolium ions such as imidazolium ions and ethylmethylimidazolium ions; pyridinium ions, hydrogen ions, tetraethylphosphonium ions, tetramethylphosphonium ions, tetraphenylphosphonium ions, triphenylsulfonium ions, and triethylsulfonium ions. Out of these, preferable cations are alkali metal ions, with lithium ions being particularly preferable.

With a battery comprising a positive electrode having an electron conducting material as described above and an electrolyte containing organic solvents, an effect of suppressing oxidative decomposition of the organic solvent can be produced regardless of the type of the cation that passes between the positive electrode and the negative electrode (i.e. the cation involved in charging and discharging). The art disclosed here can thus be applied to batteries that are charged and discharged through the passage of any of various cations. The organic type electrolyte may include an organic solvent and an Li-salt, where the organic solvent may include one or mixture of the following organic chemicals, ethylene carbonate, propylene carbonate, butylene carbonate, gamma-butyrolactone, 1,2-dimethoxyethane, tetrahydrofuran, 2-methyltetrahydorofuran, 1,3-dioxolane, 4-methyl-1,3-dioxolane, methyl formate, methyl acetate, methyl propionate, dimethyl carbonate, ethyl methyl carbonate, and diethyl carbonate, and a lithium salt which may include one or more of the following salts: $LiPF_6$, $LiAsF_6$, $LiSbF_6$, $LiBF_4$, $LiClO_4$, $LiCF_3SO_3$, $Li(CF_3SO_2)_2N$, $Li(C_2F_5SO_2)_2N$, $LiC_4F_9SO_3$, $Li(CF_3SO_2)_3C$, $LiBPh_4$, LiBOB, and $Li(CF_3SO_2)(CF_3CO)N$.

As the active material of the positive electrode, a material for which absorption and release (e.g. insertion and extraction) of the above cations can take place can be selected, this being in accordance with the type of the cations. It is preferable to use an active material having a constitution including the cations. For example, in a battery that is charged and discharged through the migration of lithium ions (typically a lithium ion secondary battery), any of various lithium composite oxides containing lithium and a transition metal as constituent elements thereof can be preferably used. Examples of such composite oxides include Li—Ni-containing oxides ($LiNiO_2$ etc.), Li—Mn-containing oxides (e.g. $LiMnO_2$, $LiNi_{0.5}Mn_{1.5}O_4$, $LiMn_2O_4$ etc.), and Li—Co-containing oxides ($LiCoO_2$ etc.).

Here, 'Li—Ni-containing oxides' has a meaning encompassing not only oxides having Li and Ni as constituent elements thereof, but also composite oxides containing at least one other metallic element in addition to Li and Ni (i.e. at least one selected from transition metal elements and representative metal elements other than Li and Ni). These metallic elements may be one or two or more selected from the group consisting of Co, Al, Mn, Cr, Fe, V, Mg, Ti, Zr, Nb, Mo, W, Cu, Zn, Ga, In, Sn, La and Ce. Similarly, 'Li—Mn-containing oxides' has a meaning encompassing composite oxides containing at least one other metallic element in addition to Li and Mn (e.g. at least one metallic element selected from the group consisting of Co, Al, Ni, Cr, Fe, V, Mg, Ti, Zr, Nb, Mo, W, Cu, Zn, Ga, In, Sn, La and Ce). Likewise for 'Li—Co-containing oxides'.

The positive electrode of the battery disclosed here preferably has an active material able to make the positive electrode be at a high potential, within a range such that oxidative decomposition of the molten salt in the electrolyte of the battery is not brought about excessively. This is because, if the potential of the negative electrode is approximately fixed, then the higher the potential of the positive electrode, the higher the battery voltage can be made. For example, a constitution having an active material able to make the potential of the positive electrode at least approximately 4 V higher than the potential of metallic lithium (hereinafter written as '4 V (versus Li)' or the like) may be adopted. In a more preferable embodiment, the positive electrode has an active material able to make the potential of the positive electrode at least approximately 4.5 V (versus Li). In a yet more preferable embodiment, the positive electrode has an active material able to make the potential of the positive electrode at least approximately 5 V (versus Li). An active material able to realize such a positive electrode potential (e.g. an active material able to make the positive electrode be at such a potential upon charging) can be preferably used.

According to the battery disclosed here, even in a mode of use in which charging is carried out up to a positive electrode potential of at least 4 V (versus Li), or at least 4.5 V (versus Li), or even at least 5 V (versus Li), oxidative decomposition of the molten salt in the electrolyte can be suppressed. In other words, the effects of applying the art disclosed here are particularly well exhibited for an embodiment with a positive electrode having such a high-potential active material.

A preferable specific example of the positive electrode active material is a lithium composite oxide represented by $LiNi_xMn_{2-x}O_4$. Here, x is a number satisfying $0.3 < x < 0.7$, more preferably a number satisfying $0.45 < x < 0.55$. Other preferable specific examples of the positive electrode active material include active materials consisting of $LiMe_{0.5}^aMn_{1.5}O_4$ ($Me^a$ is Co and/or Ni), $LiMe^bPO_4$ ($Me^b$ is at least one selected from the group consisting of Cr, Co and Cu), $Li_3V_2(PO_4)_3$, $Li_2CoPO_4F$, $LiNi_{0.33}Mn_{0.33}Co_{0.33}O_2$ or the like, and active materials in which a metal oxide such as $ZrO_2$, ZnO or $Al_2O_3$ is coated with $LiCoO_2$. Alternatively, at least one material known as a 5V class active material may be selected with no particular limitations thereon.

The positive electrode of the battery disclosed here may be made to have a constitution in which a mixture containing an electron conducting material and an active material as described above is held on an electrically conductive member consisting of a metal or the like. As the electrically conductive member (collector), a rod-like body, plate-like body, foil-like body, mesh-like body or the like consisting of a metal such as Al, Ni or Ti may be used. For example, a constitution in which a layer of a mixture containing the electron conducting material and the active material (active material-containing layer) is provided on the surface of a sheet-like electrically conductive member (e.g. Al foil) may be used. In addition to the active material and the electron conducting material, the active material-containing layer may as required contain one or two or more kinds of other materials commonly used in positive electrodes. Examples of such materials are binders. For example, at least one binder selected from polyvinylidene fluoride (PVDF), polytetrafluoroethylene (PTFE), poly(vinylidene fluoride-hexafluoropropylene) copolymers (PVDF-HFP), and so on may be used. Although there are no particular limitations, the amount used of the electron conducting material relative to 100 parts by mass of the active material may, for example, be made to be in a range of 1 to 15 parts by mass. Moreover, the amount used of a binder relative to 100 parts by mass of the active material may, for example, be made to be in a range of 1 to 10 parts by mass.

A positive electrode having such a constitution can, for example, be manufactured as follows. That is, a slurry in which the active material, the electron conducting material and a binder are dispersed in a prescribed ratio (mass ratio) in an appropriate solvent is prepared. This slurry is applied onto the surface of an electrically conductive member (e.g. Al foil). As the method of applying on the slurry, a coating method using a roll coater, a bar coater, a doctor blade or the like, a screen printing method, a transfer method or the like can be adopted as appropriate. So that the applying on of the slurry can be carried out more appropriately, thickeners (e.g. carboxymethyl cellulose), pH adjusters and so on may be used as appropriate. After that, the solvent is removed from the slurry, and pressing is carried out in the thickness direction if required. In this way, a positive electrode having an active material-containing layer on the surface of an electrically conductive member can be obtained.

Another embodiment of the positive electrode of the battery disclosed here is a positive electrode obtained by mixing the active material, the electron conducting material, a binder and so on together and compression-molding into a prescribed shape (e.g. a disk shape). As the binder, one as described earlier or the like can be used.

The battery disclosed here contains an electrolyte, for example containing a molten salt. As the molten salt constituting the electrolyte, any of various salts commonly referred to as 'ambient temperature molten salts', 'ionic liquids' or the like, for example at least one molten salt such as a molten salt having an aromatic cation such as an imidazolium salt or a pyridinium salt, an aliphatic quaternary ammonium salt, or a sulfonium salt, can be selected, although there is no limitation to the above.

Examples of imidazolium salts are ones having an imidazolium cation such as:
  a dialkylimidazolium ion such as a dimethylimidazolium ion, an ethylmethylimidazolium ion, a propylmethylimidazolium ion, a butylmethylimidazolium ion, a hexylmethylimidazolium ion or an octylmethylimidazolium ion; or
  a trialkylimidazolium ion such as a 1,2,3-trimethylimidazolium ion, a 1-ethyl-2,3-dimethylimidazolium ion, a 1-butyl-2,3-dimethylimidazolium ion or a 1-hexyl-2,3-dimethylimidazolium ion.

Examples of anions able to form a molten salt together with such an imidazolium ion (cation) include $BF_4^-$, $PF_6^-$, $CF_3SO_3^-$, $(CF_3SO_2)_2N^-$, $(C_2F_5SO_2)_2N^-$, $Cl^-$ and $Br^-$.

Specific examples of imidazolium salts include ethylmethylimidazolium tetrafluoroborate (EMI-$BF_4$), ethylmethylimidazolium trifluoromethanesulfonylimide (EMI-TFSI), propylmethylimidazolium tetrafluoroborate, 1,2-diethyl-3-methylimidazolium trifluoromethanesulfonylimide (DEMI-TFSI), and 1,2,4-triethyl-3-methylimidazolium trifluoromethanesulfonylimide (TEMI-TFSI).

Examples of pyridinium salts are ones having an alkyl pyridinium ion such as a 1-ethylpyridinium ion, a 1-butylpyridinium ion or a 1-hexylpyridinium ion. A salt between such a pyridinium ion (cation) and an anion as described above can be used. Specific examples of pyridinium salts include 1-ethylpyridinium tetrafluoroborate and 1-ethylpyridinium trifluoromethanesulfonylimide.

Specific examples of ammonium salts include trimethylpropylammonium trifluoromethanesulfonylimide (TMPA-TFSI), diethylmethylpropylammonium trifluoromethanesulfonylimide, and 1-butyl-1-methylpyrrolidinium trifluoromethanesulfonylimide.

Specific examples of sulfonium salts include triethylsulfonium trifluoromethanesulfonylimide (TES-TFSI).

The electrolyte may be made to have a composition substantially constituted from at least one molten salt as described above. As a molten salt constituting the electrolyte, for example, one at least part (preferably the whole) of which exhibits a liquid state in at least part of a temperature range from −50 to 100° C. can be selected. In general it is preferable to select one that exhibits a liquid state in at least part of a temperature range from −30 to 80° C. An example of a preferable molten salt is one able to maintain a liquid state in a temperature range of at least from 10 to 40° C. A more preferable molten salt is one able to maintain a liquid state in a temperature range of at least from 0 to 60° C. (more preferably from −10 to 60° C., particularly preferably from −30 to 60° C.).

In the case that the electrolyte contains two or more kinds of molten salts, it is preferable to select at least one of these molten salts to be one that exhibits a liquid state in a temperature range as above. It is preferable to select the types and proportions of the two or more kinds of molten salts such that the mixture thereof exhibits a liquid state in a temperature range as above.

In one preferable embodiment of the battery disclosed here, the electrolyte further contains a supporting electrolyte as a cation source. For example, as a supporting electrolyte in a battery that is charged and discharged through the migration of lithium ions (typically a lithium ion secondary battery), a compound able to supply lithium ions to the electrolyte (a lithium source) can be selected. As such a compound, a lithium salt that will dissolve in the molten salt can be preferably used. For example, a salt between a lithium ion and an anion such as $BF_4^-$, $PF_6^-$, $CF_3SO_3^-$, $(CF_3SO_2)_2N^-$, or $(C_2F_5SO_2)_2N^-$ can be used. It is preferable to use a salt between a lithium ion and an anion of the same type as the anion in the molten salt.

There are no particular limitations on the concentration of the supporting electrolyte contained in the electrolyte. For example, a composition containing 0.1 to 5 mol of the supporting electrolyte (lithium salt etc.) per 1 liter of the electrolyte may be used. It is generally preferable to make this concentration be such that the supporting electrolyte can dissolve stably (i.e. without precipitation or the like being observed) at least in a temperature range of 10° C. and above (preferably 0° C. and above).

The electrolyte may be made to have a composition substantially constituted from the at least one molten salt and a supporting electrolyte (e.g. lithium salt) as described above. An electrolyte that has such a composition and exhibits a liquid state in a temperature range as mentioned earlier is preferable. An electrolyte able to maintain a liquid state in a temperature range at least from 10 to 40° C. is particularly preferable.

Moreover, the electrolyte may contain general solvents (typically organic solvents). As such solvents, it is generally appropriate to select aprotic solvents. For example, the electrolyte may be made to contain one or two or more kinds of solvents selected from aprotic solvents used as constituent components of general lithium ion secondary battery electrolytes such as propylene carbonate, ethylene carbonate, 1,2-dimethoxyethane, 1,2-diethoxyethane, γ-butyrolactone, tetrahydrofuran, 1,3-dioxolane, dimethyl carbonate, diethyl carbonate and ethyl methyl carbonate.

Although there are no particular limitations, with an electrolyte containing such a solvent, the solvent content is preferably made to be not more than the molten salt content. That is, the solvent content relative to 50 parts by mass of the molten salt in the electrolyte may be made to be not more than 50 parts by mass. Moreover, the solvent content relative to 50 parts by mass of the molten salt in the electrolyte may be made to be not more than 15 parts by mass, or not more than 5 parts by mass, or even not more than 1 part by mass. An electrolyte in which the molten salt is made to be the principal component in this way is a preferable example of the electrolyte in the battery disclosed here.

The battery disclosed here may have a negative electrode having an active material for which absorption and release (e.g. insertion and extraction) of the cation described earlier can take place, this being in accordance with the type of the cation. As such a negative electrode active material, a carbon material having an amorphous structure and/or a graphite structure can be used. For example, one or two or more kinds selected from active materials commonly used in lithium ion secondary battery negative electrodes such as natural graphite, mesocarbon microbeads (MCMBs), highly ordered pyrolytic graphite (HOPG), hard carbon and soft carbon can be preferably used, although there is no limitation thereto.

The negative electrode of the battery disclosed here preferably has an active material able to make the negative electrode be at a low electric potential, within a range such that decomposition (e.g. reductive decomposition) of the molten salt in the electrolyte of the battery is not brought about excessively. This is because, if the potential of the positive electrode is approximately fixed, then the lower the potential of the negative electrode, the higher the battery voltage can be made. In one preferable embodiment, a constitution having an active material able to maintain the electric potential of the negative electrode at approximately 0.01 V (versus Li) or above even when the battery has been charged may be adopted. More preferably, the negative electrode has an active material able to make the potential of the negative electrode at least approximately 1 V (versus Li). In a yet more preferable embodiment, the negative electrode has an active material able to make the potential of the negative electrode at least approximately 1.2 V (versus Li). In a particularly preferable embodiment, the negative electrode has an active material able to make the potential of the negative electrode at least approximately 1.5 V (versus Li). An active material able to realize such a negative electrode potential can be preferably used. For example, an active material able to maintain the negative electrode potential at at least a potential as above when the state of charge (SOC) is approximately 60% can be preferably selected. An active material able to maintain the negative electrode potential at at least a potential as above when the SOC is approximately 100% is more preferable.

A specific example of a material that can be preferably used as the negative electrode active material is a lithium titanate represented by $Li_4Ti_5O_{12}$.

The negative electrode of the battery disclosed here may be made to have a constitution in which such an active material is held on an electrically conductive member consisting of a metal or the like. A rod-like body, plate-like body, foil-like body, mesh-like body or the like consisting of a metal such as Cu, Al, Ni or Ti may be used as the electrically conductive member (collector). For example, a constitution in which a layer of the active material (an active material-containing layer) is provided on the surface of a sheet-like electrically conductive member (e.g. Cu foil) may be used. In addition to the active material, the active material-containing layer may as required contain one or two or more kinds of other materials commonly used in negative electrodes. Examples of such materials are binders. For example, a binder as for the active material-containing layer of the positive electrode may be used. Although there are no particular limitations, the amount used of the binder relative to 100 parts by mass of the active material may, for example, be made to be in a range of approximately 1 to 10 parts by mass. A negative electrode having such a constitution can, for example, be manufactured using the same method as for the positive electrode.

The battery disclosed here may be made to have a constitution in which an electrolyte as described earlier is disposed between such a positive electrode and an negative electrode. Alternatively, the battery may be made to have a constitution in which a separator is disposed between the positive electrode and the negative electrode, and the electrolyte is soaked into the separator. As the separator, for example, a porous film consisting of a polyolefin resin such as polyethylene (PE) or polypropylene (PP) may be used. Moreover, a woven cloth or nonwoven cloth consisting of polypropylene, polyethylene terephthalate (PET), methyl cellulose (MC) or the like may be used.

The battery disclosed here may be suitable as a secondary battery used such that the electric potential of the positive electrode is, for example, in a range of approximately 3 to 4.5 V (versus Li) (in a more preferable embodiment, approximately 3 to 5 V (versus Li)). Alternatively, the battery may be suitable as a secondary battery used such that the battery voltage (inter-electrode voltage) is approximately 1.5 V or above. For example, the battery may be suitable as a lithium ion secondary battery used under such conditions.

EXAMPLES

Experimental Example 1

Study into Electrode-Constituting Materials

The present experimental example is an example in which a study was carried out into the effect of the type of the material constituting an electrode on the electrochemical stability of a molten salt.

(Manufacture of Cell 1)

$TiO_2$ nanoparticles (average particle diameter: 20 nm) and polyvinylidene fluoride (PVDF) were mixed together in N-methylpyrrolidone (NMP). The $TiO_2$:PVDF mass ratio in the mixture was approximately 7:1. The mixture was applied onto Al foil and then dried. As the PVDF, 'KF Polymer #1120' (trademark), a product of Kureha Chemical Industry Co., Ltd. was used.

Taking the aluminum foil having the $TiO_2$ held on the surface thereof as a working electrode, and taking a solution of 1.25 mol/L of lithium trifluorosulfonylimide (LiTFSI) as a supporting electrolyte in 1-ethyl-3-methylimidazolium trifluorosulfonylimide (EMI-TFSI) as an electrolyte, a 3-electrode electrochemical cell (cell 1) was constructed. Pt was used as the counter electrode of the cell. Ag was used as the reference electrode.

(Manufacture of cell 2)

A working electrode in which $Ti_4O_7$ is held on the surface of Al foil was manufactured as with cell 1, except that $Ti_4O_7$ particles (average particle diameter: 1 µm) were used instead of the $TiO_2$ nanoparticles. An electrochemical cell (cell 2) having a constitution as for cell 1 was constructed using this working electrode.

(Manufacture of Cell 3)

A working electrode in which TiC is held on the surface of Al foil was manufactured as with cell 1, except that TiC particles (average particle diameter: 2 µm) were used instead of the $TiO_2$ nanoparticles. An electrochemical cell (cell 3) having a constitution as for cell 1 was constructed using this working electrode.

(Manufacture of Cell 4)

A working electrode in which carbon is held on the surface of Al foil was manufactured as described above, except that carbon particles (acetylene black, a product of Denki Kagaku Kogyo Kabushiki Kaisha, trademark 'HS-100', average particle diameter: 1 µm) were used instead of the $TiO_2$ nanoparticles. An electrochemical cell (cell 4) having a constitution as for cell 1 was constructed using this working electrode.

(Cyclic Voltammetry Measurements)

For the cells 1 to 4 manufactured as described above, cyclic voltammetry measurements were carried out with a sweep rate of 100 mV/sec at room temperature (approximately 25° C.). The measurement results are shown in FIG. 1.

As shown in FIG. 1, with cell 4 in which carbon was held on the working electrode, upon the potential relative to metallic lithium exceeding 4.8 V, the oxidative decomposition current increased suddenly. In contrast with this, with each of cells 1 to 3 in which $TiO_2$, $Ti_4O_7$ or TiC respectively was held on the working electrode, the potential at which the oxidative decomposition current started to rise was higher than with cell 4. Specifically, for each of these cells, no sudden rise in the oxidative decomposition current was observed up to at least approximately 5 V. Moreover, the extent of increase of the oxidative decomposition current was also low. That is, with the cells in which these materials were held on the working electrode, the oxidative decomposition voltage (the electrochemical stability) of the molten salt was increased compared with the cell in which carbon was used. In other words, these materials had less of an effect of promoting oxidative decomposition of the molten salt than carbon.

Experimental Example 2

Manufacture of Batteries

The present experimental example is an example in which batteries were manufactured using various electron conducting materials.

(Manufacture of Battery 1)

A positive electrode was manufactured as follows. That is, the $TiO_2$ nanoparticles used in experimental example 1 and the carbon particles used in experimental example 1 were mixed together in a mass ratio of approximately 1:10, and mechanochemical treatment (1300 rpm, 120 minutes) was carried out in a nitrogen atmosphere. As a result, particles (particles 1) in which $TiO_2$ nanoparticles were held on the surface of carbon particles were obtained.

$LiNiO_5Mn_{1.5}O_4$ as an active material, the particles 1 as an electron conducting material, and PVDF as a binder were mixed together with NMP. The mixture contained the $LiNi_{0.5}Mn_{1.5}O_4$, the particles 1 and the PVDF in a mass ratio of approximately 85:10:5. The mixture was applied onto one surface of Al foil (a positive electrode collector) of thickness approximately 15 µm. The applied material was dried at 80° C., and then pressing was carried out in the thickness direction, thus manufacturing a sheet in which approximately 6 mg/cm$^2$ of an active material-containing layer was formed on one surface of the collector. This sheet was cut to 4 cm×5 cm, thus obtaining a positive electrode.

Moreover, a negative electrode was manufactured as follows. That is, a lithium titanate ($Li_4Ti_5O_{12}$) as an active material, carbon black (CB) as an electron conducting material, and PVDF as a binder were mixed together with NMP. The mixture contained the $Li_4Ti_5O_{12}$, the CB and the PVDF in a mass ratio of approximately 85:10:5. As the $Li_4Ti_5O_{12}$, a product of Japan Pure Chemical Co., Ltd. was used. As the CB and the PVDF, the same ones as those used in the manufacture of the positive electrode were used. The mixture was applied onto one surface of Al foil (a negative electrode collector) of thickness approximately 15 μm. The applied material was dried at 80° C., and then pressing was carried out in the thickness direction, thus manufacturing a sheet in which approximately 8 mg/cm$^2$ of an active material-containing layer was formed on one surface of the collector. This sheet was cut to 4 cm×5 cm, thus obtaining a negative electrode.

A battery was constructed using the positive electrode and negative electrode obtained in this way. As a separator, a porous polyethylene film cut to 4 cm×5 cm was used. Moreover, as an electrolyte, one obtained by adding LiTFSI to EMI-TFSI in a proportion of 1.25 mol/L and then mixing by stirring of was used. The positive electrode and the negative electrode were disposed with the separator therebetween such that the active material-containing layers were facing one another. The electrolyte was then dripped onto the interface between the positive electrode and the separator and the interface between the separator and the negative electrode. In this way, a laminate-type battery 1 with a positive electrode having an electron conducting material (particles 1) in which $TiO_2$ (a barrier material) is held on the surface of carbon particles, and an electrolyte containing a molten salt was manufactured.

(Manufacture of Battery 2)

The same $Ti_4O_7$ particles as those held on the electrode in cell 2 were used as the electron conducting material of the positive electrode instead of the particles 1 used in battery 1. That is, $LiNi_{0.5}Mn_{1.5}O_4$ as an active material, the $Ti_4O_7$ particles as an electron conducting material, and PVDF as a binder were mixed together with NMP. The mixture contained the $LiNi_{0.5}Mn_{1.5}O_4$, the $Ti_4O_7$ particles and the PVDF in a mass ratio of approximately 85:10:5. A positive electrode was manufactured as for battery 1 using this mixture. A battery 2 was then manufactured as for battery 1, except that this positive electrode was used.

(Manufacture of Battery 3)

The same TiC particles as those held on the electrode in cell 3 were used as the electron conducting material of the positive electrode instead of the $Ti_4O_7$ particles. Other than this, a battery 3 was manufactured as for battery 2.

(Manufacture of Battery 4)

The same carbon particles as those held on the electrode in cell 4 were used as the electron conducting material of the positive electrode instead of the $Ti_4O_7$ particles. Other than this, a battery 4 was manufactured as for battery 2.

Note that the theoretical capacity of each of the batteries manufactured in the present experimental example was approximately 16 mAh.

Experimental Example 3

Observation of Charge-discharge Profile

A charge-discharge test was carried out for each of the batteries manufactured in experimental example 2.

That is, at room temperature (25° C.), each battery was charged to 3.5 V (versus the negative electrode) using a constant current with a current density of 1/5 C, and then after pausing for 5 minutes, was discharged to 1.5 V (versus the negative electrode) using a constant current of 1/5 C. The symbol 'C' here represents the hour rate of the current. A current density of 1/5 C means the current density (ampere; A) at which an amount of electricity corresponding to the battery capacity (ampere hour; Ah) of the battery can be supplied in 5 hours. Here, the current density of 1/5 C is approximately 3.2 mA.

Figure 2:
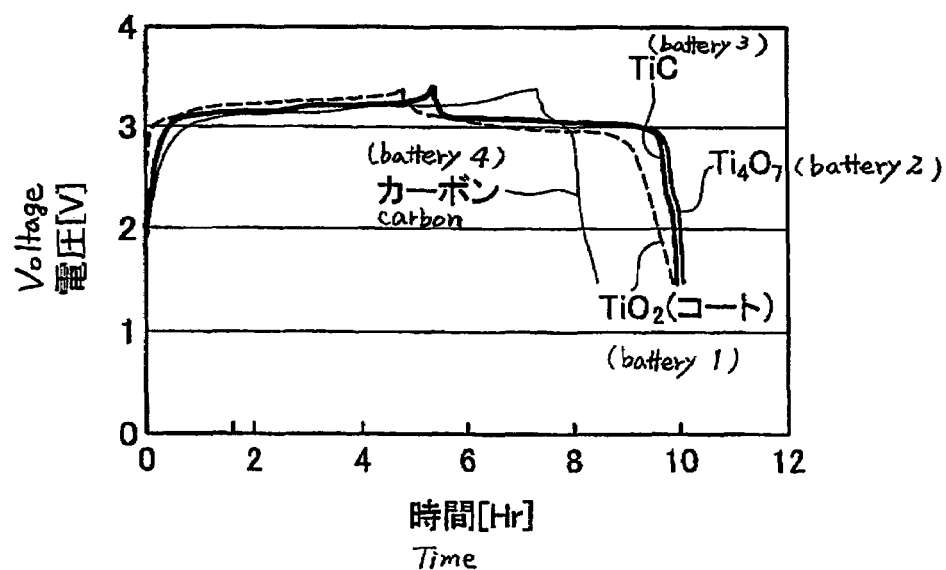
FIG. 2 is a graph showing the voltage profile obtained upon charging and discharging for batteries constructed using an appropriate electrolyte and several positive electrodes having different electron conducting materials.

The voltage profiles of the batteries upon carrying out charging and discharging in this way are shown in FIG. 2. Note that the vertical axis in FIG. 2 shows the potential of the positive electrode relative to the negative electrode (the inter-electrode voltage).

As shown in FIG. 2, in the voltage profile for battery 4 in which carbon was used as the electron conducting material of the positive electrode, an irreversible plateau appeared in the vicinity of an inter-electrode voltage of 3.4 V (corresponding to approximately 4.9 V versus Li), and the inter-electrode voltage did not readily rise upon continuing charging beyond this. This suggests that the charging current supplied to the battery was being consumed by oxidative decomposition of the molten salt. In this way, with battery 4, lithium ions could not be sufficiently inserted into the active material of the negative electrode, and hence the discharge time down to an inter-electrode voltage of 1.5 V was short (approximately 1 hour). That is, with battery 4, charging and discharging could not be carried out properly.

In contrast with this, as shown in FIG. 2, with each of batteries 1 to 3, normal charging and discharging was possible. Moreover, the charge time for each of batteries 1 to 3 was approximately 4.5 to 5.5 hours, and the discharge time for each was approximately 4.5 to 5.5 hours. In this way, for each of batteries 1 to 3, the coulomb efficiency (the ratio of the discharge time to the charge time) was good. Note that the average battery voltage (inter-electrode voltage) for each of these batteries was approximately 3.1 to 3.2 V.

Experimental Example 4

Study into Electrode-constituting Materials

The present experimental example is another example in which a study was carried out into the effect of the type of the material constituting an electrode on the electrochemical stability of a molten salt.

(Manufacture of Cell 5)

TaC particles (average particle diameter: 5 μm) were used instead of the $TiO_2$ nanoparticles held on the electrode in cell 1. Other than this, the same procedure as for cell 1 was carried out, thus manufacturing a working electrode in which TaC is held on the surface of Al foil. An electrochemical cell (cell 5) having the same constitution as for cell 1 was constructed using this working electrode.

(Manufacture of Cell 6)

A working electrode in which ITO is held on the surface of Al foil was manufactured as with cell 1, except that ITO particles (average particle diameter: 0.5 μm, In:Sn atomic ratio=1:50) were used instead of the $TiO_2$ nanoparticles. An electrochemical cell (cell 6) having a constitution as for cell 1 was constructed using this working electrode.

(Manufacture of Cell 7)

A working electrode in which tungsten (W) is held on the surface of Al foil was manufactured as with cell 1, except that metallic tungsten particles (average particle diameter of primary particles: 0.1 μm) were used instead of the $TiO_2$ nanoparticles. An electrochemical cell (cell 7) having a constitution as for cell 1 was constructed using this working electrode.

(Cyclic Voltammetry Measurements)

For the cells manufactured as described above, cyclic voltammetry measurements were carried out with a sweep rate of 100 mV/sec at room temperature (approximately 25° C.) as in experimental example 1. The measurement results are shown in FIG. 3.

Figure 3:
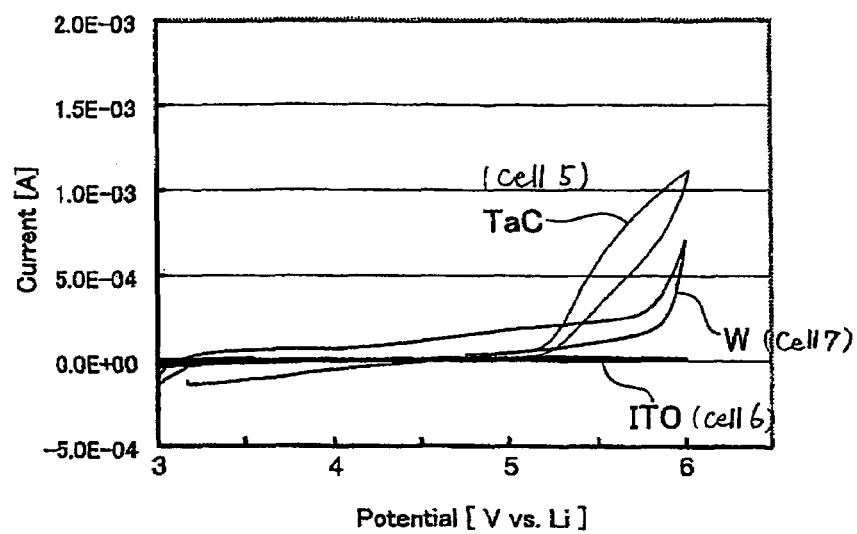
FIG. 3 is a graph showing results of cyclic voltammetry measurements for cells manufactured using an appropriate electrolyte and several electrodes on which different materials are held.

As shown in FIG. 3, with each of cells 5 to 7 in which TaC, ITO or W respectively was held on the working electrode, no sudden rise in the oxidative decomposition current was exhibited up to at least approximately 5 V. Moreover, the extent of increase of the oxidative decomposition current was also low. That is, these materials had less of an effect of promoting oxidative decomposition of the molten salt than carbon (see FIG. 1).

Furthermore, the present inventors also carried out similar experiments using cells in which $SnO_2$ or $ZrO_2$ is held on the working electrode. As a result, it was found that for these materials as well, the effect of promoting oxidative decomposition of the molten salt (EMI-TFSI) is less than that of carbon.

Experimental Example 5

Manufacture of Batteries

The present experimental example is an example in which batteries were manufactured using various electron conducting materials.

(Manufacture of Battery 5)

The same TaC particles as those held on the electrode in cell 5 were used as the electron conducting material of the positive electrode instead of the $Ti_4O_7$ particles used in battery 2. Other than this, a battery 5 was manufactured as for battery 2.

(Manufacture of Battery 6)

The same ITO particles as those held on the electrode in cell 6 were used as the electron conducting material of the positive electrode instead of the $Ti_4O_7$ particles. Other than this, a battery 6 was manufactured as for battery 2.

(Manufacture of Battery 7)

The same W particles as those held on the electrode in cell 7 were used as the electron conducting material of the positive electrode instead of the $Ti_4O_7$ particles. Other than this, a battery 7 was manufactured as for battery 2.

Experimental Example 6

Observation of Charge-discharge Profile

A charge-discharge test was carried out under the same conditions as in experimental example 3 for each of the batteries manufactured in experimental example 5. The results are shown in FIG. 4.

Figure 4:
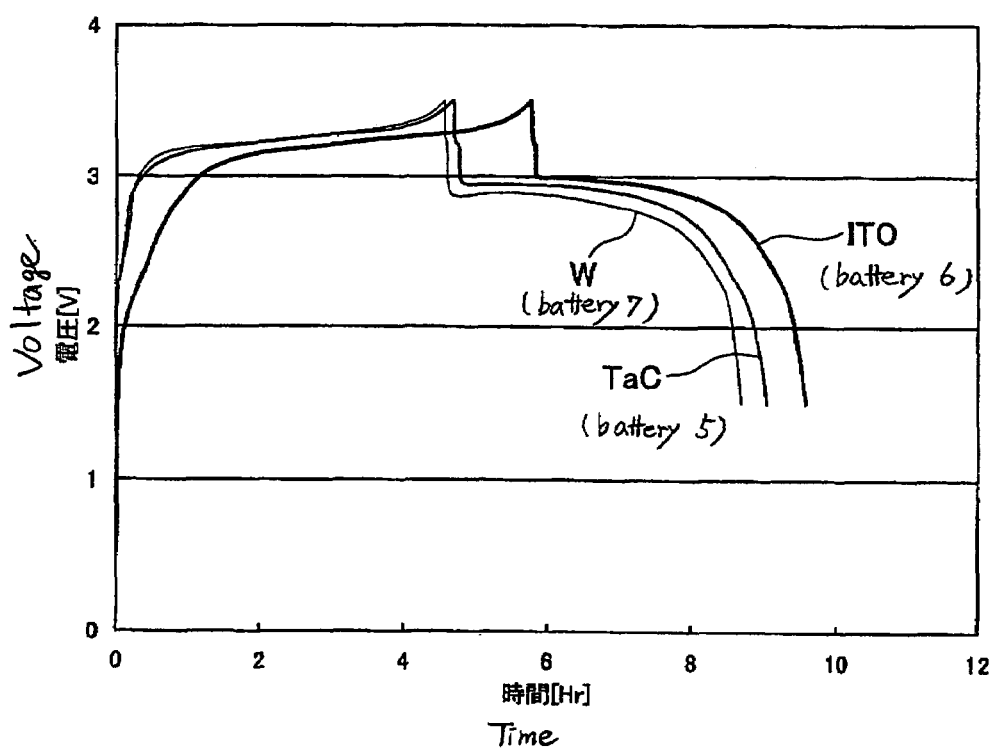
FIG. 4 is a graph showing the voltage profile obtained upon charging and discharging for batteries constructed using an appropriate electrolyte and several positive electrodes having different electron conducting materials.

As shown in FIG. 4, normal charging and discharging was possible for each of these batteries. Moreover, the charge time for each of the batteries was approximately 4.5 to 6 hours, and the discharge time for each was approximately 4 to 5 hours. In this way, for each of the batteries, the coulomb efficiency was good. Particularly good results were obtained for battery 5 and battery 7. Note that the average battery voltage (interelectrode voltage) for each of these batteries was approximately 3.1 to 3.2 V.

Experimental Example 7

Manufacture of Batteries

The present experimental example is an example in which batteries were manufactured using a positive electrode having TiC as the electron conducting material, and several electrolytes having different compositions.

(Manufacture of Battery 8)

A solution of 1.25 mol/L of $LiBF_4$ as a supporting electrolyte in 1-ethyl-3-methylimidazolium tetrafluoroborate (EMI-$BF_4$) was used as an electrolyte. Moreover, as a positive electrode, the same as that used in battery 3 (having TiC particles as the electron conducting material) was used. Other than this, a battery 8 was manufactured as for battery 3.

(Manufacture of Battery 9)

A solution of 1.25 mol/L of LiTFSI as a supporting electrolyte in triethylsulfonium trifluorosulfonylimide (TES-TFSI) was used as an electrolyte. Other than this, a battery 9 was manufactured as for battery 8.

(Manufacture of Battery 10)

A solution of 1.25 mol/L of LiTFSI as a supporting electrolyte in trimethylpropylammonium trifluoromethanesulfonylimide (TMPA-TFSI) was used as an electrolyte. Other than this, a battery 10 was manufactured as for battery 8.

Experimental Example 8

Observation of Charge-discharge Profile

A charge-discharge test was carried out under the same conditions as in experimental example 3 for each of the batteries manufactured in experimental example 7. The results are shown in FIG. 5.

Figure 5:
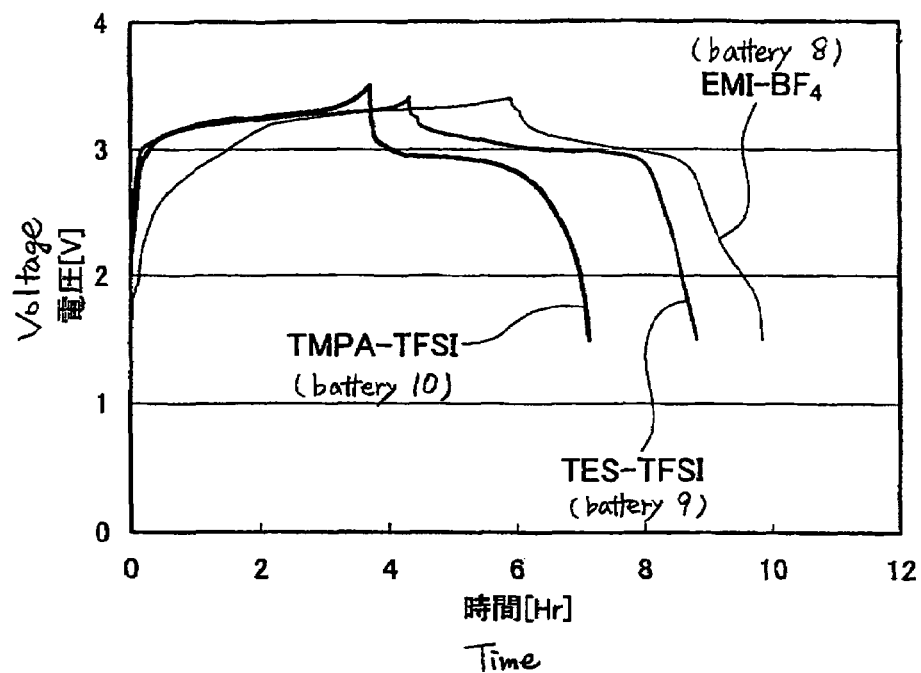
FIG. 5 is a graph showing the voltage profile obtained upon charging and discharging for batteries constructed using an appropriate positive electrode and several electrolytes of different types.

As shown in FIG. 5, normal charging and discharging was possible for each of these batteries. Moreover, the charge time for each of the batteries was approximately 3.5 to 6 hours, and the discharge time for each was approximately 3.5 to 4 hours. In this way, for each of the batteries, the coulomb efficiency was good. Particularly good results were obtained for battery 9 and battery 10. Note that the average battery voltage (interelectrode voltage) for each of these batteries was approximately 3.15 to 3.25 V.

Figure 6:
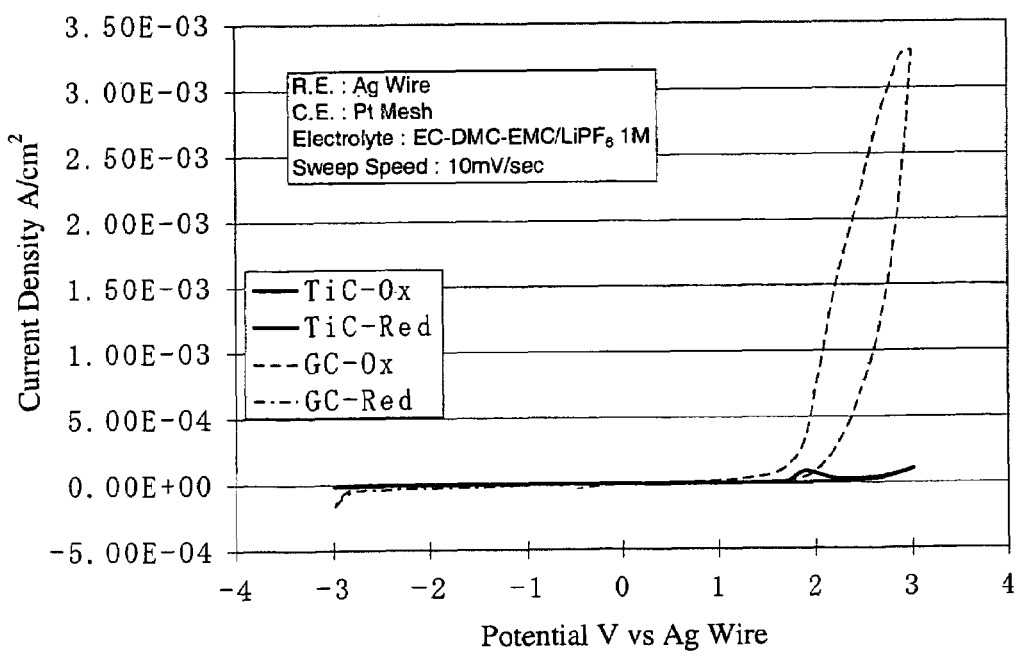
FIG. 6 is a graph showing voltage profiles obtained upon charging and discharging of batteries having an organic electrolyte.

Examples of the present invention are not limited to batteries having a molten salt electrolyte. FIG. 6 shows a charge/discharge test for two batteries, both using the same organic electrolyte. The electrolyte was 1 M $LiPF_6$ dissolved in a mixture of ethylene carbonate/dimethyl carbonate/ethyl methyl carbonate (EC/DMC/EMC). A first battery using graphitic carbon (GC) as the electron conducting material suffered decomposition of the electrolyte, as indicated by the large oxidative decomposition current. However, oxidative decomposition of the electrolyte in a second battery was greatly reduced by using titanium carbide (TiC) as the electron conductive material, as indicated by the much lower oxidative decomposition current. Other electron conductive materials, such as those described herein, can also be used in a battery according to the present invention having an organic electrolyte.

Specific examples of the present invention have been described in detail above; however, these examples are merely illustrative, and do not restrict the scope of the claims. Any of various modifications of the specific examples illustrated above are included in the art described in the claims.

U.S. Provisional Patent Applications Ser. Nos. 60/553,636 and 60/614,517 are incorporated herein by reference.

Moreover, the technical elements described in the present specification and drawings exhibit technical usefulness either alone or in any of various combinations, and there is no limitation to the combinations described in the claims at the time of filing. Moreover, the art illustrated in the present specification and drawings attains a plurality of objects simultaneously, but there is technical usefulness in attaining one of these objects.

We claim:

1. A battery comprising:
   a molten salt electrolyte that exhibits a liquid state in at least part of a temperature range between 10 and 40 degrees C.; and
   a positive electrode having a mixture of an active material and an electron conducting material, said mixture being supported on an electrically conducting member;
   wherein said electron conducting material is in particulate form and has at least on a surface thereof a separate barrier layer substantially constituted from at least one material selected from the group consisting of:
   (a) oxides having at least one element which belongs to group 2 to 14 in the third or subsequent period of the periodic table as a constituent element thereof;
   (b) nitrides having at least one element which belongs to group 2 to 14 in the third or subsequent period of the periodic table as a constituent element thereof; and
   (c) tungsten,
   wherein the barrier layer decreases an oxidative decomposition of the electrolyte.

2. The battery according to claim 1, wherein said barrier layer contains an oxide having at least one metal which belongs to group 4 to 14 of the periodic table as a constituent element thereof.

3. The battery according to claim 2, wherein said barrier layer contains an oxide having at least one metal which belongs to group 4 to 6 of the periodic table as a constituent element thereof.

4. The battery according to claim 3, wherein said barrier layer is substantially consisting of a titanium oxide.

5. The battery according to claim 2, wherein said barrier layer contains an oxide having at least one metal which belongs to group 13 or 14 of the periodic table as a constituent element thereof.

6. The battery according to claim 5, wherein said barrier layer is substantially consisting of an indium-tin oxide.

7. The battery according to claim 1, wherein said barrier layer contains a carbide having at least one metal which belongs to group 4 to 14 of the periodic table as a constituent element thereof.

8. The battery according to claim 7, wherein said barrier layer contains a carbide having at least one metal which belongs to group 4 to 6 of the periodic table as a constituent element thereof.

9. The battery according to claim 8, wherein said barrier layer is substantially consisting of a titanium carbide.

10. The battery according to claim 8, wherein said barrier layer is substantially consisting of a tantalum carbide and/or iron nitride.

11. The battery according to claim 1, wherein the material constituting said barrier layer has a lower activity than at least carbon to oxidative decomposition of said electrolyte.

12. The battery according to claim 1, wherein the material constituting said barrier layer is electrically conductive.

13. The battery according to claim 1, wherein the material constituting the interior of said electron conducting material is electrically conductive carbon.

14. The battery according to claim 1, wherein the material constituting the interior of said electron conducting material is a metal.

15. The battery according to claim 1, wherein said active material of said positive electrode is substantially consisting of a composite oxide having lithium and a transition metal as constituent elements thereof.

16. The battery according to claim 15, wherein said active material of said positive electrode is substantially consisting of a composite oxide having lithium, nickel and manganese as constituent elements thereof.

17. The battery according to claim 1, wherein said positive electrode has an active material able to make the electric potential of said positive electrode at least 4.5 V higher than the electric potential of metallic lithium.

18. The battery according to claim 1, wherein said electrolyte is a molten salt, and the cation in said molten salt is at least one cation selected from an imidazolium ion, art ammonium ion and a sulfonium ion.

19. The battery according to claim 1, wherein the principal component of said electrolyte is a molten salt.

20. The battery according to claim 19, wherein said electrolyte contains a lithium salt as a supporting electrolyte.

21. The battery according to claim 1, further comprising a negative electrode having an active material able to absorb and release lithium ions.

22. The battery according to claim 21, wherein said negative electrode has an active material able to maintain the electric potential of said negative electrode at 1 V or more higher than the potential of metallic lithium.

23. The battery according to claim 22, wherein said active material of said negative electrode is substantially consisting of a lithium titanate represented by Li4Ti5O12.

24. A method of manufacturing a battery comprising the steps of:
   preparing an electron conducting material having at least on a surface thereof a separate barrier layer substantially constituted from at least one material selected from the group consisting of (a) oxides having at least one element which belongs to group 2 to 14 in the third or subsequent period of the periodic table as a constituent element thereof;
   (b) nitrides having at least one element which belongs to group 2 to 14 in the third or subsequent period of the periodic table as a constituent element thereof; and (c) tungsten, the electron conducting material being in particulate form;
   manufacturing a positive electrode using said electron conducting material and a positive electrode active material; and
   constructing the battery using said positive electrode, a molten salt electrolyte that exhibits a liquid state in at least part of a temperature range between 10 and 40 degrees C., and a negative electrode, wherein the barrier layer decreases an oxidative decomposition of the electrolyte.

25. The method according to claim 24, wherein said electron conducting material is obtained by attaching nanoparticles consisting substantially of said material selected from the group (a) to (c) onto the surface of carbon particles and/or metal particles so as to form said barrier layer on the surface of said particles.

* * * * *